US006928801B1

(12) United States Patent
Papproth

(10) Patent No.: US 6,928,801 B1
(45) Date of Patent: Aug. 16, 2005

(54) LAWN MOWER BLADE STOP

(76) Inventor: Roger E. Papproth, 8170 Old Rte. 13 West, Carrier Mills, IL (US) 62917

( * ) Notice: Subject to any disclaimer, the term of this patent is extended or adjusted under 35 U.S.C. 154(b) by 0 days.

(21) Appl. No.: 10/273,763

(22) Filed: Oct. 18, 2002

(51) Int. Cl.$^7$ ............................................. A01D 34/03
(52) U.S. Cl. ..................................................... 56/17.5
(58) Field of Search ................................ 56/17.5, 17.4, 56/255, 25.4; 416/146 R

(56) References Cited

U.S. PATENT DOCUMENTS

| | | | |
|---|---|---|---|
| 3,173,234 A | 3/1965 | Vodinelich | 56/320.2 |
| 4,149,693 A * | 4/1979 | LoNigro | 248/342 |
| 4,208,859 A | 6/1980 | Brockway | 56/255 |
| 4,564,991 A * | 1/1986 | Taylor | 29/426.5 |
| 4,624,644 A * | 11/1986 | Hall | 440/49 |
| 4,850,800 A * | 7/1989 | Zygutis | 416/146 R |
| 4,882,960 A | 11/1989 | Kugler | 81/488 |
| 4,956,905 A * | 9/1990 | Davidson | 29/281.1 |
| 5,865,018 A | 2/1999 | Wanie | 56/17.4 |
| 6,272,724 B1 * | 8/2001 | Sterling et al. | 29/281.1 |
| 6,276,039 B1 | 8/2001 | Barnes | 29/402.05 |

* cited by examiner

Primary Examiner—Thomas B. Will
Assistant Examiner—Alicia Torres
(74) Attorney, Agent, or Firm—Grace J. Fishel

(57) ABSTRACT

A lawn mower blade stop for a rotary lawn mower. The blade stop is preferably formed from first and second L-shaped members welded together to form a U-shaped channel with a plate serving as a barrier to rotation of the blade. The U-shaped channel is received on and makes at least three point contact with the inside of a skirt of a rotary lawn mower housing. A threaded member making at least one-point contact with the outside of the skirt fixes the blade stop in a plane with respect to the skirt.

7 Claims, 2 Drawing Sheets

LAWN MOWER BLADE STOP

BACKGROUND OF THE INVENTION

1. Field of the Invention

The present invention relates to a lawn mower blade stop for use on a rotary lawn mower for use in safely removing and installing lawn mower blades.

2. Brief Description of the Prior Art

The cutting blade of a rotary lawn mower generally comprises a flat elongate member having a cutting edge adjacent each end and on opposite sides. The cutting blade has a center hole and is attached to a shaft by one or more bolts which are threadably received in a bore formed in the end of the shaft or in a fitting keyed to the shaft. As a routine measure in maintaining a rotary lawn mower, it is necessary to remove the blade such that it can be sharpened, straightened or replaced.

In order to securely attach the blade to the shaft, it is necessary to apply a relatively high torque. The same force must be applied when loosening the bolt. The application of such force, causes the blade and the shaft to rotate, which motion must be resisted in order for the bolt to be tightened or loosened. In general the force is too great for an individual to hold the blade with one hand while removing the bolt with the other and the consequences of slipping are serious. Most users block the blade with a piece of wood but the wood tends to fall out when the mower is turned on its side to access the blade. A successful blade stop needs to be inexpensive to manufacture, capable of resisting the high torque applied during blade removal and installation, easy to install without pre-alignment with the blade, etc. While a number of different blade stops which clamp to the blade or to the lawn mower housing have been proposed, none have been entirely satisfactory.

BRIEF SUMMARY OF THE INVENTION

In view of the above, it is an object of the present invention to provide a rotary lawn mower blade stop which is inexpensive to manufacture. It is another object to provide a blade stop that is capable of resisting the high torque applied during blade removal and installation. It is also an object to provide a blade stop which is easy to install without pre-alignment with the blade. Other objects and features of the invention will be in part apparent and in part pointed out hereinafter.

In accordance with the invention, a lawn mower blade stop is provided for securing a blade against rotation relative to a deck of a rotary lawn mower. The deck has a skirt with a bottom edge. The blade stop includes a U-shaped channel member, a threaded member and a plate.

The U-shaped channel member has spaced first and second sidewalls for receipt of a bottom edge of the skirt with the first sidewall being on the outside of the skirt and the second sidewall being on the inside of the skirt so that the second sidewall makes at least three-point contact with the skirt when the blade stop is installed. The threaded member passes through the first sidewall and makes at least one-point contact with the skirt. The plate is attached to the second sidewall in a manner that it falls within a predetermined path of the cutting blade.

In use, the three-point contact between the second sidewall and the skirt and one-point contact between the bolt and the skirt fixes the blade stop in a plane with respect to the skirt while the plate serves as a barrier stopping the blade against rotation.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which one of various possible embodiments of the invention is illustrated, corresponding reference characters refer to corresponding parts throughout the several views of the drawings in which.

DETAILED DESCRIPTION OF THE INVENTION

Figure 1:
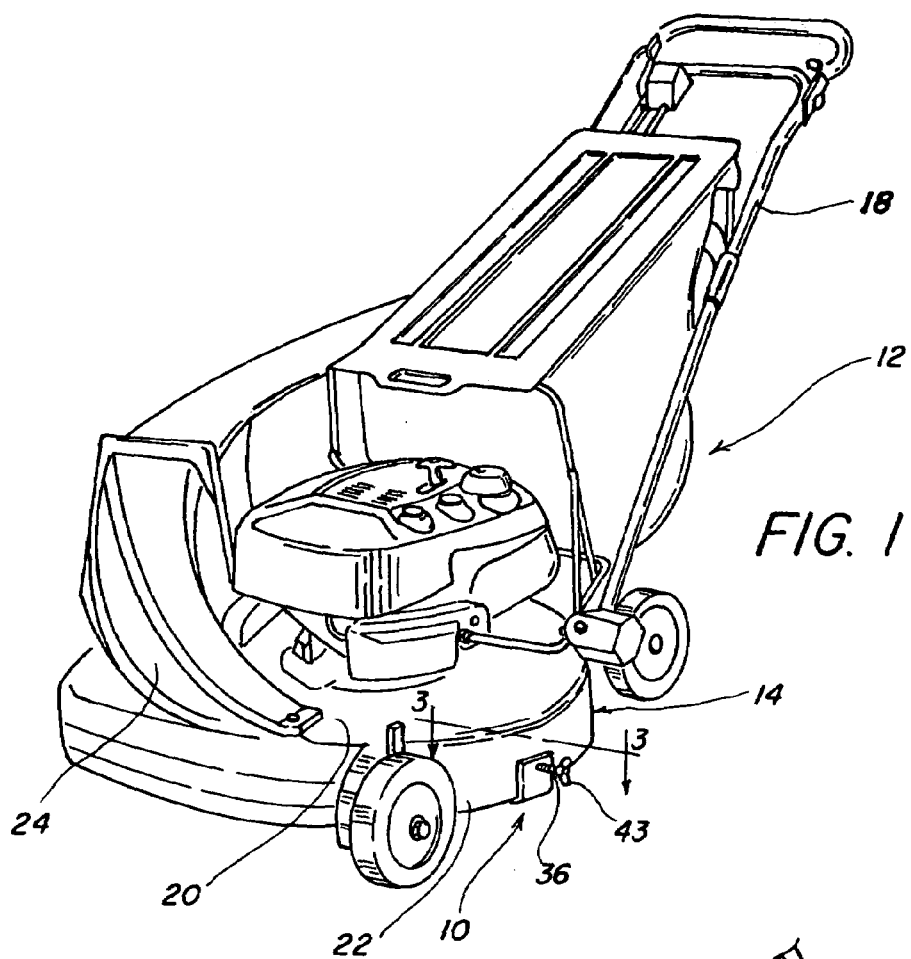
FIG. 1 is a blade stop in accordance with the present invention shown installed on a rotary lawn mower.

Referring to the drawings more particularly by reference character, reference numeral 10 refers to a lawn mower blade stop in accordance with the present invention. Blade stop 10 is for use on a rotary mower 12 of the type having a housing 14 with a cutting blade 16 mounted on a shaft journaled for rotation in housing 14. While blade stop 10 is illustrated in connection with a rotary mower 12 of the type with a handle 18, it will be understood that the precise configuration of the mower/housing is not critical and it is clear that blade stop 10 may be used on a single blade riding mower, triplex mower and so forth.

Housing 12 includes a generally horizontal deck 20 with a surrounding skirt 22 that extends below blade 16. Skirt 22 may be non-symmetrical and may include an outlet 24 through which grass clippings are discharged. Skirt 22 is generally vertical and but may have a curvature top to bottom for the purpose of better directing grass clippings through outlet 24. A bottom edge 26 of skirt 22 may be rolled for reinforcement. Blade 16 includes a sharpened leading edge 28 and a trailing edge 30 which respectively lead and trail during rotation of the blade on the shaft. Blade 16 may be directly mounted to the shaft or through a bolt or a nut 32, details of which attachment do not figure in the present invention.

In major part, blade stop 10 includes a U-shaped channel 34, a threaded member 36 and a plate 38 attached to the U-shaped channel and serving as a barrier to blade rotation. U-shaped channel 34 has first and second sidewalls 40, 42, respectively which are spaced apart a distance sufficient to receive bottom edge 26 of skirt 22 on most rotary mowers 12 with first sidewall 40 being on the outside of skirt 22 and second sidewall 42 being on the inside of skirt 22. For most purposes, a spacing of one inch between first and second sidewalls 40, 42 has been found satisfactory.

Threaded member 36 is threadedly received in and passes through first sidewall 40 in the direction of second sidewall 42 for contact with the outside of skirt 22. The head of threaded member 36 is shown with a wing nut 43. It will be understood, however, that the head may be slotted, hex or some other configuration. It will also be appreciated that the leading end of threaded member 42 making contact with skirt 22 may be outfitted with a rubber bumper, plate or the like for the purpose of spreading the load on skirt 22 or to avoid damaging the finish on the outside of skirt 22. In addition, an opposite end of threaded member 36 may be extended or outfitted with a handle such that threaded member 36 may be used as a handle for tipping rotary mower 12 on its side for removal of cutting blade 16. When threaded member 36 is a handle, it is not necessary to hold the handle to stabilize blade stop 10 during removal of blade 16 unlike some prior art blade stops.

Plate 38 is attached to a side edge of second sidewall 42. The width of plate 38 in a horizontal direction when U-shaped channel 34 is mounted on bottom edge 26 is such that plate 38 falls within a predetermined path of cutting blade 16 and serves as a barrier to rotation. The required width of plate 38 depends upon the particular configuration of housing 14 and the relationship of the housing to blade 16. Typically, a width of one and one-half inches has been found satisfactory.

Figure 2:
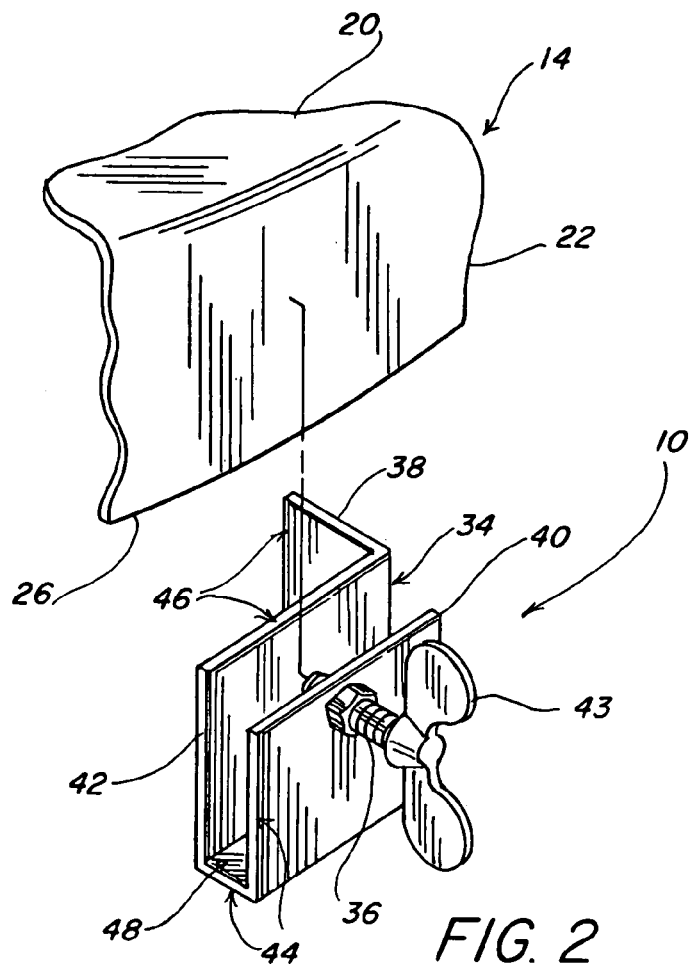
FIG. 2 is an exploded perspective view showing the blade stop in process of being installed or removed from the mower.

In a presently preferred form, U-shaped channel 34 and plate 38 are formed by welding together first and second L-shaped members 44 and 46, respectively, as best seen in FIG. 2. A toe of first L-shaped member 44 is welded to a side edge of second L-shaped member 46. As shown, first L-shaped member 44 forms first sidewall 40 and a bight 48 of U-shaped channel 34. Second L-shaped member 46 forms second sidewall 42 and plate 38. Formed in this manner, plate 38 is not easily bent or sheared off. The preferred construction is sturdy and inexpensive to construct.

Figure 3:
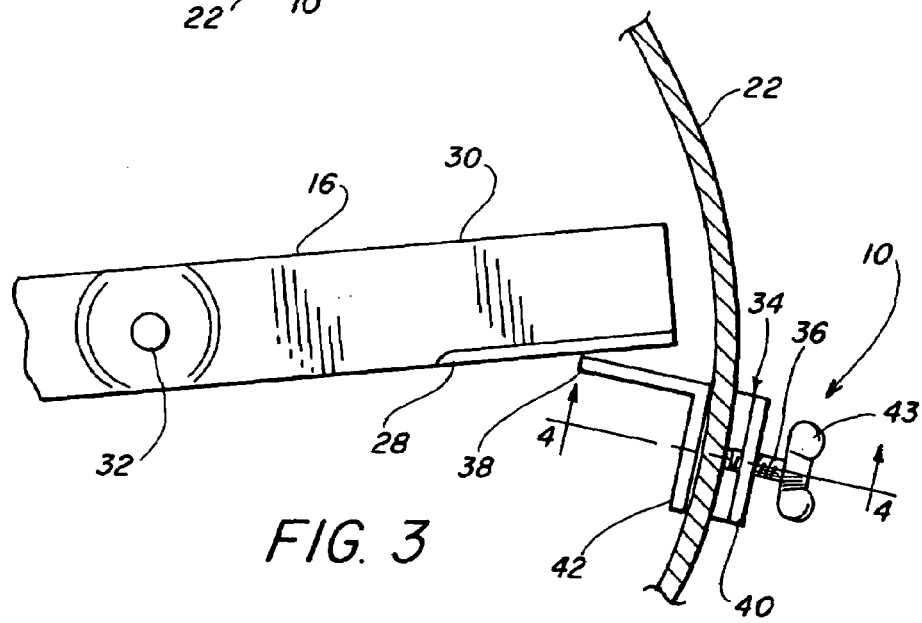
FIG. 3 is a plan view in section taken along the plane of 3—3 in FIG. 1.
Figure 4:
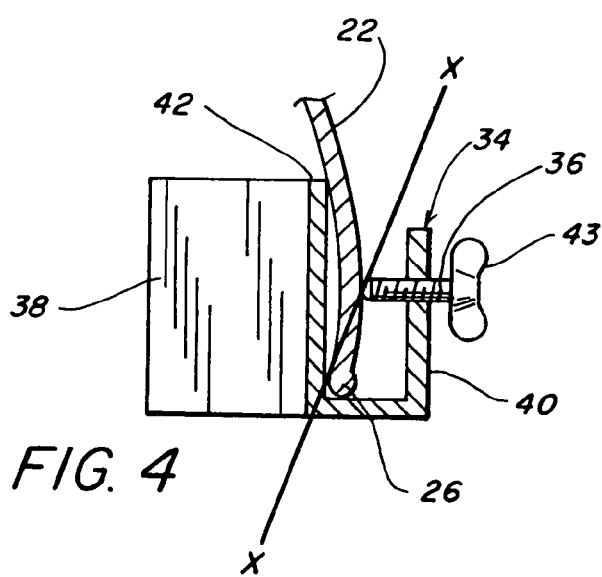
FIG. 4 is an elevational view in section taken along the plane of 4—4 in FIG. 3.

In operative position, blade stop 10 prevents blade 16 from freely rotating within housing 14. Blade stop 10 is easily installed on housing 14 by positioning U-shaped channel 34 along a bottom edge of skirt 22 and tightening threaded member 36 against skirt 22 forcing the bottom edge of the skirt into contact with second sidewall 42. As shown in FIGS. 3 and 4, skirt 33 makes three-point contact with blade stop 20 defining plane X—X as shown in FIG. 4 securely locking blade stop 10 to housing 14. In consequence, the use of blade stop 10 is not limited to housings 14 with a vertical skirt 22 but may be used on rotary mowers 12 with skirts 22 having a range of cross-sections, a representative example of which is shown in FIG. 4.

After blade stop 10 has been installed on skirt 22, a tool may be applied to bolt or nut 32. As the tool is rotated in a direction to loosen bolt or nut 32, blade 16 rotates with the tool until it makes contact with plate 38 and is stopped. In order to remove blade 16 from the shaft, it is necessary to apply a relatively high torque. This force is resisted by blade stop 10 which is securely held in plane X—X and does not slip along skirt 22. On installation of a new or reconditioned blade 16, the operation is reversed and blade 16 will rotate with the tool in an opposite direction until the blade makes contact with an opposite side of plate 38 and is stopped. The force necessary to securely tighten bolt or nut 32 is resisted by blade stop 10 in a corresponding manner.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A lawn mower blade stop for securing a blade against rotation relative to a deck of a rotary lawn mower, the deck having a skirt with a bottom edge, said stop consisting of:
   a U-shaped right angled channel with spaced first and second fixed sidewalls connected by a bottom wall for receipt of a bottom edge of a skirt with the first sidewall being on the outside of the skirt and the second sidewall being on the inside of the skirt; said second sidewall and bottom wall making at least three-point contact with the skirt;
   a threaded member threadedly received and passing through the first sidewall for making at least one-point contact with the skirt;
   said three-point contact between the second sidewall and bottom wall and the skirt and one-point contact between the threaded member and the skirt fixing the blade stop in a plane with respect to the skirt; and
   a single plate formed as an integral flange on the second sidewall and serving as a barrier to rotation of the blade.

2. The blade stop of claim 1 wherein the U-shaped channel is about one inch wide.

3. The blade stop of claim 2 wherein the plate in a horizontal direction is about one and one-half inches wide.

4. A lawn mower blade stop for securing a blade against rotation relative to a deck of a rotary lawn mower, the deck having a skirt with a bottom edge, said stop consisting of:
   a U-shaped right angled channel with spaced first and second sidewalls connected by a bottom wall for receipt of a bottom edge of a skirt with the first sidewall being on the outside of the skirt and the second sidewall being on the inside of the skirt; said second sidewall and the bottom wall making at least three-point contact with the skirt;
   a bolt threadedly received and passing through the first sidewall for making at least one-point contact with the skirt;
   said three-point contact between the second sidewall and the bottom wall and the skirt and one-point contact between the bolt and the skirt fixing the blade stop in a plane with respect to the skirt; and
   a single plate formed as an integral flange on the second sidewall and serving as a barrier to rotation of the blade, said U-shaped channel and plate formed by welding together first and second L-shaped members, said first L-shaped member forming the first sidewall and the bottom wall of the U-shaped member and said second L-shaped member forming the second sidewall of the U-shaped member and the plate.

5. The blade stop of claim 4 wherein a toe of the first L-shaped member is welded to a side edge of the second L-shaped member.

6. The blade stop of claim 5 wherein the U-shaped channel is about one inch wide.

7. The blade stop of claim 6 wherein the plate in a horizontal direction is about one and one-half inches wide.

* * * * *